United States Patent Office

3,803,254
Patented Apr. 9, 1974

3,803,254
PROCESS FOR PRODUCING OLIGOMERS OF UNSATURATED COMPOUNDS
Saburo Hattori, Tokyo, Hiroaki Munakata and Kengo Tatsuoka, Yokohama, and Toshio Shimizu, Tokyo, Japan, assignors to Mitsubishi Chemical Industries, Limited, Tokyo, Japan
No Drawing. Filed July 27, 1972, Ser. No. 275,754
Int. Cl. C07c 3/10
U.S. Cl. 260—669 P                                    22 Claims

ABSTRACT OF THE DISCLOSURE

Oligomers and chain oligomers are produced by reacting a vinyl aromatic compound, optionally with an $\alpha$-monoolefin or a derivative thereof, in the presence of a catalyst of a cationic palladium complex comprising a palladium ion with a complex fluoro anion or a perchlorate anion and complexed with a trivalent organophosphorous ligand. The reaction velocity is increased by adding a Lewis acid containing B, P, As or Sb and H or F, when the molar ratio of the trivalent organophosphorous ligand to the palladium ion of the catalyst is greater than, but not equal to, one.

BACKGROUND OF THE INVENTION

Field of the invention

This invention relates to a process for producing an oligomer of an unsaturated compound. More particularly, it relates to a process for producing a chain oligomer prepared from a vinyl aromatic compound and/or an $\alpha$-monoolefin or a derivative thereof.

Description of the prior art

A number of catalyst systems are well known in the art for the polymerization reactions between a vinyl aromatic compound and an $\alpha$-monoolefin. Examples are the use of rhodium chloride in the reaction of styrene with ethylene (U.S. Pat. 3,013,066), the use of palladium chloride in the same reaction (J. Orgmet. Chem., 21, 218, 1970) and the use of bis-(benzonitrile) palladium chloride in the reaction of styrene with methyl acrylate (J. Orgmet. Chem., 21, 219, 1970). However, the yields of the products obtained by these processes have not been sufficiently high for industrial purposes.

Mineral acids such as sulfuric acid and phosphoric acid (J. Org. Chem., 18, 1701–1705, 1953; 27, 1636–1640, 1962) and a $\pi$-allylnickel compound (Tet. Letters, 22, 1943–1946, 1971) are also known catalysts for the oligomerization of styrene. However, when sulfuric acid and phosphoric acid are used, the yields of byproducts cyclic dimer and byproduct polymer are too large. In addition, $\pi$-allylnickel compounds possess unsatisfactory catalytic properties because of their instability and their low catalytic activity. These deficiencies are overcome by the processes of this invention in that mild reaction conditions are required as compared to those of earlier processes, and when a vinyl aromatic compound, especially styrene, is homo-oligomerized, chain dimers thereof in high selectivity can be obtained.

Applicants had earlier discovered that oligomers of butadiene, particularly the dimers or trimers of butadiene, or co-dimers of a butadiene with a vinyl compound, e.g., ethylene, styrene or the like, can be obtained by reaction in the presence of a trivalent organophosphorous palladium catalyst containing complex fluoro anions or a perchlorate anion.

It has now been discovered that this catalyst is also useful in the production of oligomers of vinyl aromatic compounds or co-oligomers of vinyl aromatic compounds and $\alpha$-mino-olefins or derivatives thereof, and that their use results in such process advantages as more mild reaction conditions, as compared with conventional processes, and high selectivity, particulary when styrene is homo-oligomerized to form a chain dimer.

SUMMARY OF THE INVENTION

It is an object, therefore, of this invention to provide a process for producing an oligomer of a vinyl aromatic compound or a co-oligomer of a vinyl aromatic compound and an $\alpha$-monoolefin or a derivative thereof.

It is another object of this invention to provide a process for producing chain oligomers of vinyl aromatic compounds in high selectivity.

Yet another object of this invention is to provide a process for producing a chain co-dimer of a vinyl aromatic compound and an $\alpha$-monoolefin, other than the vinyl aromatic comonomer under mild reaction conditions.

Accordingly, these and other objects of this invention are achieved by the oligomerization of vinyl aromatic compounds, or by the oligomerization of a vinyl aromatic compound with an $\alpha$-monoolefin in the presence of a palladium catalyst. The catalyst consists of a central palladium ion associated with a complex fluoro anion or a perchlorate anion and complexed with a trivalent organophosphorous ligand. The reaction velocity is increased by the addition of a Lewis acid containing B, P, As or Sb and H or F, when the molar ratio of the trivalent organophosphorous ligand to the palladium ion is greater than, but not including one.

DESCRIPTION OF PREFERRED EMBODIMENTS

In the process of this invention, oligomers are formed from a vinyl aromatic compound or co-oligomers are formed from a vinyl aromatic compound and an $\alpha$-monoolefin or a derivative thereof. Suitable vinyl aromatic compounds are those having the formula:

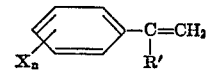

wherein R' represents hydrogen or an alkyl group, preferably a lower alkyl group; X represents alkyl, aryl, alkenyl, alkoxycarbonyl, acyloxy, halogen or a group when condensed with the phenyl group in the structure forms a naphthalene ring; $n$ represents zero or an integer from one to five. Suitable alkoxycarbonyl groups having the formula: —COOR include methoxycarbonyl and ethoxycarbonyl and suitable acyloxy groups having the formula: —OCOR include acetoxy, propionyloxy, etc., wherein R represents an alkyl group. Preferred examples of the vinyl aromatic compounds include styrene, $\alpha$-methylstyrene, o-vinyltoluene, m-vinyltoluene, p-vinyltoluene, methyl-p-vinylbenzoate, p-vinylphenyl acetate, p-vinylmonochlorobenzene and 1-vinylnaphthalene, etc.

The $\alpha$-monoolefins or derivatives thereof have the following formula:

wherein R" represents hydrogen or an alkyl group, especially a lower alkyl group; R'" represents hydrogen, an alkyl group, an alkoxycarbonyl group having an alkyl group containing less than 4 carbon atoms, or a substituted aryl group. Preferred examples of $\alpha$-monoolefins include ethylene, propylene, 1-butene, acrylic esters such as methylacrylate,, and vinyl aromatic compounds such as styrene, $\alpha$-methylstyrene, vinyltoluene, etc.

In the synthesis of a co-dimer of a vinyl aromatic compound and an $\alpha$-monoolefin or a derivative thereof which is not the vinyl aromatic compound, a 1:1 mole ratio of the reactants can be used. However, usually from 0.1 to 10 moles of the $\alpha$-monoolefin or derivative thereof is used per mole of vinyl aromatic compound. The synthesis of the co-dimers is illustrated by the following reaction:

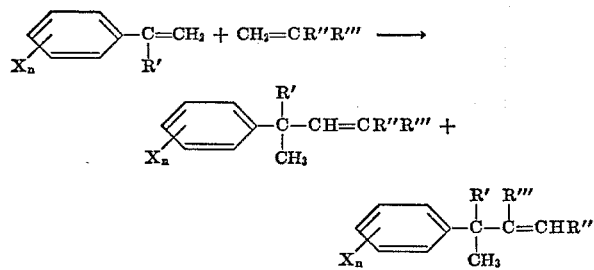

Besides the co-dimers produced as indicated in the reaction, an isomer of the dimers having a double bond in a different position and a dimer of the vinyl aromatic compound are sometimes found as products of the reaction. When the α-monoolefin used is the same as the vinyl aromatic compound, homo-oligomers, such as the following chain dimers and trimers, are produced.

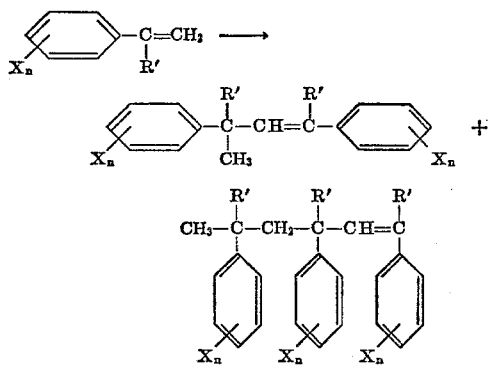

Usually, greater amounts of dimer are produced than trimer. In some instances, an isomer of one of the products is produced. When styrene is used as the monomer, 1,3-diphenyl-1-butene is produced. When α-methylstyrene is used, 2,4-diphenyl-4-methylpentene and a relatively large amount of 2,5-diphenyl-2-hexene are produced.

The catalyst used in the process of this invention is a cationic palladium complex containing a central palladium ion with a complex fluoro anion or perchlorate anion and complexed with a trivalent organophosphorous ligand. Suitable palladium compounds useful for the preparation of the catalysts include inorganic salts such as: $PdCl_2$, $PdBr_2$, $PdI_2$, $Pd(NO_3)_2$; organic palladium salts such as $Pd(OCOCH_3)_2$, $Pd(OCOC_6H_5)_2$; intramolecular palladium complexes such as $Pd(C_5H_7O_2)_2$; organopalladium complexes such as $PdL_2X_2$ wherein L is a neutral ligand and represents nitriles, e.g., acetonitrile, benzonitrile; amides, e.g., dimethylformamide, dimethylacetoamide; sulfoxides, e.g., dimethylsulfoxide; ethylenically unsaturated compounds, e.g., ethylene and styrene; dienes, e.g., butadiene, cyclooctadiene and the tert-phosphines, e.g., triethylphosphine, tricyclohexylphosphine, triphenylphosphine, etc. and X represents a halogen atom, e.g., Cl, Br, I. Suitable examples of the organopalladium complexes include: $Pd(CH_3CN)_2Cl_2$, $Pd(C_6H_5CN)_2Cl_2$, $$Pd(DMF)_2Cl_2$$

(bisdimethylformamide palladium chloride), $$Pd(DMSO)_2Cl_2$$

(bisdimethylsulfoxide palladium chloride), $Pd[P(C_6H_5)_3]_2Cl_2$, $Pd[P(C_6H_{11})_2]_2Br_2$, $Pd[P(C_2H_5)_3]_2I_2$, $Pd(CH_2=CH-CH=CH_2)Cl_2$, $Pd(CH_2=CH_2)_2Br_2$, $$Pd(C_6H_5-CH=CH_2)_2Cl_2$$

Suitable π-allyl palladium compounds include:

$(\pi\text{-}C_3H_5PdCl)_2$, $(\pi\text{-}C_3H_5PdBr)_2$, $(\pi\text{-}C_4H_7PdCl)_2$,

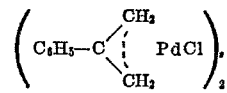

$\pi\text{-}C_3H_5PdCl[P(C_6H_5)_3]$, $\pi\text{-}C_3H_5PdCl[P(C_6H_{11})_3]$, $(\pi\text{-}C_3H_5Pd(OCOCH_3))_2$, $\pi\text{-}C_3H_5Pd(OCOCH_3)[P(C_6H_5)_3]$, and other palladium complexes such as $HPdCl[P(C_6H_5)_3]_2$, $(C_6H_5\text{-}CH_2)PdCl[P(C_6H_5)_3]_2$, $CH_3PdBr[P(C_6H_5)_3]_2$, etc.

The type of anions, which are an integral part of the palladium catalysts of this invention, consist of: $[BF_4]^-$, $[PF_6]^-$, $[SbF_6]^-$, $[AsF_6]^-$, $[SiF_6]^{-2}$ or $[ClO_4]^-$. Suitable compounds which are reacted iwth the previously described palladium compounds to form the catalysts of this invention are preferably silver salts such as $AgBF_4$, $AgPF_6$, $AgSbF_6$, $AgAsF_6$, $Ag_2SiF_6$, $AgClO_4$, thallium salts such as $TlPF_6$, carbonium ion salts such as $(C_6H_5)_3CBF_4$ and inorganic acids such as $HBF_4$, $H_2SiF_6$, $HClO_4$. The type of anion supplying reagent used in the reaction with the palladium compounds is dependent upon the type of palladium compounds used for the preparation of the catalyst. For example, when an organic palladium salt such as $Pd(OCOCH_3)_2$ is used, an acid is preferably used. When a halogen containing palladium compound such as $Pd(DMF)_2Cl_2$, or $(\pi\text{-}C_3H_5PdCl)_2$ is used, a silver salt or a thallium salt is preferably used.

The trivalent organophosphorous ligands can be tert-phosphines or tert-phosphites having the formula $PZ_1Z_2Z_3$, wherein $Z_1Z_2Z_3$ are the same or different from each other and represent alkyl groups, such as methyl, ethyl, propyl, isopropyl, butyl, tert-butyl, octyl; cycloalkyl groups such as cyclohexyl; aryl groups such as phenyl, tolyl; alkoxy groups such as methoxy, ethoxy; and aryloxy groups such as phenoxy. Suitable ligands include $P(CH_3)_3$,
$P(C_2H_5)_3$,
$P(n\text{-}C_3H_7)_3$,
$P(iso\text{-}C_3H_7)_3$,
$P(n\text{-}C_4H_9)_3$,
$P(tert\text{-}C_4H_9)_3$,
$P(C_8H_{17})_3$,
$P(C_2H_5)_2(C_6H_5)$,
$P(C_2H_5)(C_6H_5)_2$,
$P(C_6H_5)_3$,
$P(C_6H_4\text{-}CH_3)_3$,
$P(C_6H_{11})_3$,
$P(OC_2H_5)_3$,
$P(OC_6H_5)_3$, and $P(OCH_3)(C_6H_5)_2$.

The catalysts of this invention can be prepared by reacting any of the previously described palladium compounds with a compound containing a complex fluoro anion or a perchlorate anion and with a trivalent organophosphorous ligand. For example, a catalyst can be prepared by reacting a palladium compound with an anion supplying reagent in a solvent and then adding the trivalent organophosphorous compound to it. The catalyst can also be prepared by mixing appropriate quantities of a palladium compound and a trivalent phosphorous ligand in a solvent and then adding an anion supplying reagent to the mixture. The catalyst can also be prepared by adding a trivalent organophosphorous ligand to the product of the reaction between a palladium component such as $$[PdL_4][BF_4]_2,$$
$$[PdL_4][ClO_4]_2,$$

or $$[PdL_4][PF_6]_2,$$

wherein L represents the neutral ligand defined above, or $$[(acac)(COD)PdBF_4],$$
$$[\pi\text{-}C_5H_5Pd(COD)][BF_4],$$
$$[\pi\text{-}C_5H_5Pd(COD)][PF_6]$$

wherein acac represents acetylacetonate and COD represents cyclooctadiene.

In another procedure, the catalyst can also be prepared by reacting an anion supplying reagent with a palladium complex containing a trivalent organophosphorous compound such as $$Pd[P(C_6H_5)_3]_2Cl_2,$$
$$Pd[P(C_6H_{11})_3]_2Br_2,$$
$$Pd[P(C_2H_5)_3]_2I_2,$$
$$\pi\text{-}C_3H_5PdCl[P(C_6H_5)_3],$$

or $$\pi\text{-}C_3H_5PdCl[P(C_6H_{11})_3]$$

in solution.

Finally, the catalyst can also be prepared by reacting a quantity of an anion supplying reagent in solution equivalent to the number of halogen atoms in the inner coordination sphere of the following palladium complexes:

$$[Pd(C_{10}H_{13}OCH_3)X]_2,$$
$$[Pd(C_{10}H_{13}OCH_3)(H_2NCH_2CH_2NH_2)X],$$
$$Pd_2X_2[P(C_6H_5)_3]_4[BF_4]_2,$$
$$PdCl[P(C_6H_5)_3]_3[BF_4],$$
$$Pd_2X_2[P(C_2H_5)_3]_4[BF_4]_2,$$
$$Pd_2X_2[P(C_2H_5)_3]_4[PF_6]_2$$

wherein X represents Cl, Br or I. Depending on the type of palladium compound used, additional amounts of a trivalent organophosphorous ligand can be added to the solution. The catalyst resulting from these preparative procedures can be used in solution without prior separation of the catalysts. The active catalyst species is not clear. However, it would seem that catalysis occurs on the vacant coordination sites on each palladium ion of the catalyst species. These vacant sites are created when the palladium compounds are treated with the complex anion containing material. The anions originally associated with the palladium compounds leave the inner coordination spheres of the palladium ions. The vacant sites created are not reoccupied by the complex fluoro and perchlorate anions, and thus oligomerization occurs when the olefins of the invention occupy the available sites.

In the preparation of the catalysts, it is preferable to react an amount of an anion supplying reagent equivalent to the anion content of the starting palladium compound. Thus, anions such as Cl⁻, Br⁻, $NO_3^-$, $OCOCH_3^-$, acac⁻, etc. are totally replaced by a complex fluoro anion or a perchlorate anion. For example, when $PdCl_2$ is used as the palladium compound, two moles of $AgBF_4$, $AgClO_4$, $AgPF_6$ or one mole of $Ag_2SiF_6$ are reacted with one mole of $PdCl_2$. Similarly, one mole of $AgBF_4$ or $AgClO_4$ is reacted with one mole of $$\pi\text{-}C_3H_5PdCl[P(C_6H_5)_4]$$

and one mole of $HBF_4$ is reacted with one mole of $$[Pd(acac)(COD)][BF_4]$$

However, it is possible to use from 0.5 to 2.0 equivalents of an anion supplying reagent per equivalent of palladium compound in the synthesis of the catalyst.

The amounts of trivalent organophosphorous ligand used is not limited. However, it is preferable to use from 0.5 to 5 moles of the ligand per mole of palladium compound and especially preferable to use one mole of ligand per mole of palladium compound.

The catalysts of this invention have a high activity. However, when a Lewis acid containing B, P, Sb or As and F or H is added to the palladium catalyst, the overall catalytic activity is promoted. In addition, the deposition of metallic palladium through catalyst decomposition can be prevented. The effect is especially pronounced when the mole ratio of ligand to palladium compound is greater than 1 (not including 1). Suitable Lewis acids useful in this invention include $BF_3$, $PF_5$, $SbF_5$, $AsF_5$, $BH_3$. The acids can be used in solution as exemplified by the following reagents: $BF_3$—$CH_3OOH$, $BF_3$—$HOC_6H_5$ or $BF_3$—$(C_2H_5)_2O$. The amount of Lewis acid used with the palladium compound is not limited. However, it is preferable to use 0.3–2 moles of the Lewis acid per one mole of the trivalent organophosphorous ligand. High catalytic activity is achieved with a catalyst having a two-to-one mole ratio of phosphorous ligand to palladium ion and a one-to-one mole ratio of Lewis acid to palladium ion. Because of the high activity of the catalysts of this invention, only small amounts of catalyst are required to achieve sufficient catalyst activity. Usually, $10^{-6}$–$10^{-2}$ gram-atom of catalyst is used per mole of starting olefin. Preferably, however, $10^{-5}$–$10^{-3}$ gram-atom of catalyst is used per mole of the vinyl aromatic compound.

Methods for conducting the reaction of this invention are not particularly limited. One method involves mixing prepared solutions of the starting olefin and an appropriate catalyst while maintaining the reaction mixture at a specific temperature. The reaction is preferably performed under an inert atmosphere such as nitrogen, argon, or helium at a temperature of 0°–150° C., but preferably 30°–100° C. A solvent is not always necessary for the reaction. However, because an ionic catalytic species is used, it is preferable to use a polar solvent. Suitable solvents include alcohols such as methanol, ethanol; ketones such as acetone, methylethylketone; ethers such as tetrahydrofuran, dioxane, ethyleneglycol dimethyl ether, and diethyleneglycol dimethyl ether; nitro compounds such as nitromethane, and nitrobenzene; and other solvents such as acetonitrile, dimethyl acetamide, dimethyl sulfoxide, etc. Nonpolar solvents such as benzene and toluene can also be used.

The products obtained from the oligomerization of vinyl aromatic compounds and from the co-oligomerization of an α-monoolefin or derivative thereof with a vinyl aromatic compound by the processes of this invention are useful as intermediates in organic synthesis or as raw materials for the synthesis of organic resins. In particular, the chain dimers of vinyl aromatic compounds are useful as starting materials for anthraquinone dyestuffs, as solvents for ink used in pressure-sensitive paper, as solvents for polystyrene, and as lubricants, insulator oils, plasticizers, heat mediums, etc.

In the synthesis of trimers containing butadiene, a vinyl aromatic compound and an α-monoolefin, it is necessary to first form a co-oligomer of the vinyl aromatic compound with the α-monoolefin, in the absence of the butadiene. The resulting dimer is then reacted with butadiene to form the trimer. If butadiene is included with the reactants, it will react with the α-monoolefin to the exclusion of the vinyl aromatic compound, and the desired trimer will not be obtained.

Having now generally described the invention, a further understanding can be attained by reference to the following specific examples which are provided herein for purposes of illustration only and are not intended to be limiting in any manner unless otherwise so specified.

EXAMPLE 1

A 0.25 mM. quantity of π-methallyl palladium chloride [(π-$C_4H_7PdCl_2$)] and 0.5 mM. of tri-n-butylphosphine were added to 0.7 mole (74 g.) of styrene. A 0.5 mM. quantity of silver tetrafluoroborate ($AgBF_4$) was added to the mixture and silver chloride precipitated immediately. After removing the silver chloride, the reaction mixture was fed into a 200 cc. three necked flask and was reacted under a nitrogen atmosphere at 40° C. for 1.5 hours. After the reaction, the product was separated by distilling under reduced pressure (0.7 mm. Hg) to yield 63 g. of a styrene dimer fraction boiling from 128–148° C. and 11 g. of a distillation residue.

IR, NMR and mass spectrum analyses confirmed the dimer fraction to be 1,3-diphenyl-1-butene. Further analysis confirmed the presence of the trimer, 1,3,5-triphenyl-1-hexene. Conversion of styrene to product was 100% and the selectivity to styrene dimer was 83% and 15% to styrene trimer.

EXAMPLE 2

A 0.1 mM. quantity of 1-methyl-π-allyl palladium chloride

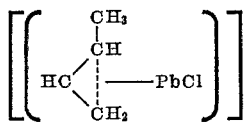

and 0.2 mM. of tri-n-butylphosphine were dissolved in 1.0 mole (104 g.) of styrene, and 0.2 mM. of $AgPF_6$ in 20 ml. of acetone was added to the solution. Without removing the precipitated AgCl, the reaction mixture was reacted at 40° C. for 6 hours in a 200 cc. flask. Conversion of styrene was 94%, and the selectivity to styrene dimer was 84% and 15% to styrene trimer.

EXAMPLE 3

A 0.5 mM. quantity of bisbenzonitrile palladium chloride $[Pd(C_6H_5CN)_2Cl_2]$ and 0.5 mM. of tri-n-octylphosphine were dissolved in one mole (104 g.) of styrene, and one mM. of $AgBF_4$ was added to the solution. Without removing the precipitated AgCl, the mixture was reacted at 40–150° C. for five minutes. The conversion of styrene was 96%, and the selectivity to styrene dimer was 60% and 25% to styrene trimer.

EXAMPLE 4

A 0.5 mM. quantity of bisdimethylformamide palladium chloride $[Pd(DMF)_2Cl_2]$ and 0.5 mM. of tri-n-butylphosphine were dissolved in one mole (104 g.) of styrene. To this solution was added 5 g. of methanol containing 0.5 mM. of $Ag_2SiF_6$. Without removing the precipitated AgCl, the mixture was reacted at 32° C. under a nitrogen atmosphere for 1.5 hours in a 200 cc. three-necked flask. Conversion of styrene was 52%, and the selectivity to styrene dimer was 83%, and 15% to styrene trimer.

EXAMPLE 5

A 0.3 mM. quantity of bisbenzonitrile palladium chloride and 0.3 mM. of tri-n-butylphosphine were dissolved in one mole of styrene, and 0.6 mM. of $AgBF_4$ was added to the solution. Without removing the precipitated AgCl, the mixture was reacted at 50° C. for 1 hour. Conversion of styrene was 90% and the selectivity to styrene dimer was 81%, and 17% to styrene trimer.

EXAMPLE 6

A 0.1 mM. quantity of π-allyl palladium chloride $[(\pi\text{-}C_3H_5PdCl)_2]$ and 0.2 mM. of triphenylphosphine were dissolved in one mole of styrene, and 0.2 mM. of $AgClO_4$ was added. Without removing the precipitated AgCl, the mixture was reacted at 30° C. for 4 hours. After the reaction, 0.2 mM. of tetraphenyl arsonium chloride $[As(C_6H_5)_4Cl]$ was added to the solution to precipitate perchlorate ion as $As(C_6H_5)_4ClO_4$. The salt was filtered and the reaction products were distilled to separate the products. Conversion of the styrene was 75% and the selectivity to styrene dimer was 83%, and 15% to styrene trimer.

EXAMPLE 7

A 1.0 mM. quantity of bisbenzonitrile palladium chloride and one mM. of tri-n-butylphosphine were dissolved in 0.5 mole (70 g.) of α-methylstyrene, and two mM. of $AgBF_4$ was added to the solution. After removing the precipitated AgCl, the mixture was reacted at 70° C.–100° C. for 1.5 hours. After the reaction, the reaction mixture was distilled to yield 55 g. of an α-methylstyrene dimer fraction boiling from 125° C. to 140° C. under less than one mm. Hg pressure. Conversion of α-methylstyrene was 92%, and the selectivity to α-methylstyrene dimer was 85% and 13% to α-methylstyrene trimer. The composition of the dimer fraction was as follows:

| | Percent |
|---|---|
| 2,5-diphenyl-2-hexene | 59 |
| 2,4-diphenyl-4-methyl-2-pentene | 33 |
| Other dimers | 8 |

EXAMPLE 8

A 0.1 mM. quantity of π-methylallyl palladium chloride was dissolved in acetone and 0.20 mM. of tri-n-butylphosphine and 0.20 mM. of $AgBF_4$ were added to the solution. After filtering the precipitated AgCl, the catalyst solution and two moles of vinyltoluene were fed into a 500 cc. flask and the mixture was reacted at 60° C. for 2 hours under an argon atmosphere. Conversion of the vinyl toluene was 87% and the selectivity to dimer was 78% and 21% to trimer.

EXAMPLE 9

A 0.05 mM. quantity of π-allyl palladium bromide $[(\pi\text{-}C_3H_5PdBr)_2]$, 0.10 mM. of tri-n-butylphosphine and 0.10 mM. of $AgClO_4$ were reacted to prepare a catalyst solution. To this solution was added 0.50 mole (52 g.) of styrene and the resulting mixture was reacted at 50° C. for four hours. Conversion of styrene was about 100% and the selectivity to dimer was 96%, and 4% to trimer.

EXAMPLES 10–16

In the following examples, a one mole quantity of styrene was reacted with various catalysts. The compositions of these catalysts and the reaction conditions are shown in Table I. The results of each of these reactions are shown in Table II.

TABLE I

| | Catalyst (components for preparation of the catalysts) | | | | | | Reaction temperature (° C.) | Reaction time (hrs.) |
|---|---|---|---|---|---|---|---|---|
| Example number | Palladium compound | Mm. | Anion containing component | Mm. | Phosphorous ligand | Mm. | | |
| 10 | $Pd(OCOCH_3)_2$ | 0.10 | $HBF_4$ | 0.2 | $P(n\text{-}C_4H_9)_3$ | 0.10 | 60 | 5 |
| 11 | $Pd(DMF)_4(BF_4)_2$ | 0.20 | | | $P(n\text{-}C_4H_9)_3$ | 0.20 | 60 | 3 |
| 12 | $\pi\text{-}C_5H_5Pd(COD)(BF_4)$ | 0.5 | $HBF_4$ | 0.50 | $P(n\text{-}C_4H_9)_3$ | 0.5 | 50 | 5 |
| 13 | $Pd(BD)Cl_2$ | 0.10 | $AgBF_4$ | 0.20 | $P(i\text{-}C_3H_7)_3$ | 0.10 | 60 | 2 |
| 14 | $\left( C_6H_5\text{-}C\begin{smallmatrix}CH_2\\\ \\CH_2\end{smallmatrix}PdCl \right)_2$ | 0.5 | $AgBF_4$ | 0.10 | $P(i\text{-}C_3H_7)_3$ | 0.10 | 60 | 4 |
| 15 | $\pi\text{-}C_3H_5Pd(P\phi_3)Br$ | 0.10 | $AgPF_6$ | 0.10 | | | 60 | 2 |
| 16 | $(\pi\text{-}C_3H_5PdBr)_2$ | 0.05 | $AgSbF_6$ | 0.10 | $P(i\text{-}C_3H_7)_3$ | 0.10 | 60 | 3 |

Note.—DMF=Dimethylformamide; COD=Cyclooctadiene; BD=Butadiene; $P\phi_3$=Triphenylphosphine; $P(n\text{-}C_4H_9)_3$= Tri-n-butylphosphine; $P(i\text{-}C_3H_7)_3$=Triisopropylphosphine.

TABLE II

| Example number | Conversion of styrene (percent) | Selectivity (percent) | |
|---|---|---|---|
| | | Dimer | Trimer |
| 10 | ~100 | 84 | 15 |
| 11 | ~100 | 83 | 16 |
| 12 | ~100 | 83 | 16 |
| 13 | 87 | 95 | 4 |
| 14 | 90 | 96 | 3 |
| 15 | 70 | 82 | 17 |
| 16 | ~100 | 95 | 4 |

EXAMPLES 17–23

In the following examples, a π-allyl palladium halide was used as the starting palladium compound, AgBF$_4$ was used as the anion containing component and various phosphorous ligands were used in the preparation of each catalyst. Styrene was used as the olefin component. Reaction conditions are shown in Table III and the results of each reaction are shown in Table IV. In Examples 17–22 and Example 23, acetone and dioxane, respectively, were used as the solvents.

TABLE III

| Example number | Catalyst (components for preparation of the catalysts) | | | | | Styrene (mole) | Reaction temperature (° C.) | Reaction time (hrs.) |
|---|---|---|---|---|---|---|---|---|
| | Palladium compound | Mm. | AgBF$_4$ (mm.) | Phosphorous ligand | Mm. | | | |
| 17 | (π-C$_4$H$_7$PdCl)$_2$ | 0.10 | 0.20 | P(C$_6$H$_5$)$_3$ | 0.20 | 2.0 | 60 | 3 |
| 18 | (π-C$_4$H$_7$PdCl)$_2$ | 0.10 | 0.20 | P(C$_6$H$_{11}$)$_3$ | 0.20 | 2.0 | 60 | 2.5 |
| 19 | (π-C$_4$H$_7$PdCl)$_2$ | 0.10 | 0.20 | P(i-C$_3$H$_7$)$_3$ | 0.20 | 2.0 | 60 | 2.0 |
| 20 | (π-C$_3$H$_5$PdCl)$_2$ | 0.25 | 0.50 | P(OC$_6$H$_5$)$_3$ | 0.50 | 1.0 | 60 | 5 |
| 21 | (π-C$_3$H$_5$PdBr)$_2$ | 0.05 | 0.10 | P(C$_2$H$_5$)$_3$ | 0.10 | 1.0 | 60 | 1.25 |
| 22 | (π-C$_3$H$_5$PdCl)$_2$ | 0.05 | 0.10 | P(i-C$_3$H$_7$)$_3$ | 0.10 | 2.0 | 60 | 8.0 |
| 23 | (π-C$_3$H$_5$PdCl)$_2$ | 0.05 | 0.10 | P(i-C$_3$H$_7$)$_3$ | 0.10 | 1.0 | 60 | 3.0 |

TABLE IV

| Example | Conversion styrene (percent) | Selectivity (percent) | |
|---|---|---|---|
| | | Dimer | Trimer |
| 17 | 93 | 86 | 13 |
| 18 | 93 | 96 | 4 |
| 19 | ~100 | 97 | 3 |
| 20 | 40 | 83 | 15 |
| 21 | 94 | 84 | 15 |
| 22 | 87 | 94 | 5 |
| 23 | 35 | 98 | 2 |

EXAMPLES 24–27

In the following examples, a 0.05 mM. quantity of a π-allyl palladium compound, 0.10 mM. of AgBF$_4$, 0.20 mM. of various phosphorous ligands and 0.10 mM. of various Lewis acids were used in the preparation of the catalysts. One mole quantities of styrene were reacted at 60° C. in each example. Results of each of these reactions are shown in Table V. In Example 24, two moles of styrene were used.

TABLE V

| Example number | Catalyst (components for preparation of the catalysts) | | | | Reaction time (hrs.) | Conversion of styrene (percent) | Selectivity (percent) | |
|---|---|---|---|---|---|---|---|---|
| | Palladium compound | Anion containing component | Phosphorous ligand | Lewis acid | | | Dimer | Trimer |
| 24 | (π-C$_3$H$_5$PdCl)$_2$ | AgBF$_4$ | P(i-C$_3$H$_7$)$_3$ | BF$_3$—(C$_2$H$_5$)$_2$O | 5.0 | 98 | 95 | 5 |
| 25 | (π-C$_3$H$_5$PdCl)$_2$ | AgBF$_4$ | P(i-C$_3$H$_7$)$_3$ | BF$_3$—CH$_3$COOH | 1⅔ | 93 | 94 | 5 |
| 26 | (π-C$_3$H$_5$PdCl)$_2$ | AgBF$_4$ | P(i-C$_3$H$_7$)$_3$ | SbF$_5$ | 2.0~ | 100 | 95 | 4 |
| 27 | (π-C$_3$H$_5$PdCl)$_2$ | AgBF$_4$ | P(n-C$_4$H$_9$)$_3$ | BF$_3$—(C$_2$H$_5$)$_2$O | 3.0 | 85 | 83 | 15 |

EXAMPLE 28

In this example, 0.10 mM. of

Pd$_2$Cl$_2$[P(C$_6$H$_5$)$_3$]$_4$[BF$_4$]$_2$, 0.20 mM. of AgBF$_4$ and 0.20 mM. of BF$_3$—(C$_2$H$_5$)$_2$O were used in the preparation of the catalyst. A one mole quantity of styrene was reacted in the presence of the catalyst at 60° C. for 3 hours. Conversion of styrene was 95%, and the selectivity to dimer was 84% and 15% to trimer.

EXAMPLE 29

A 0.05 mM. quantity of π-allyl palladium bromide was dissolved in two ml. of benzene, and 0.20 mM. of triethylphosphine and 0.10 mM. of BF$_3$—(C$_2$H$_5$)$_2$O were added to the solution. In addition, 0.10 mM. of AgBF$_4$ in two ml. of acetone was added to the mixture while stirring, and the precipitated AgCl was removed. The catalyst solution and one mole (104 g.) of styrene were fed into a 500 ml. flask. The mixture was reacted at 60° C. for one hour under an argon atmosphere and then four moles (416 g.) of styrene was continuously supplied for 2.5 hours. The reaction temperature was maintained at 70° C. and the total reaction time was four hours. Conversion of styrene was 99%, and the selectivity to dimer was 92%, 6% to trimer, and 2% to tetramer.

EXAMPLE 30

A 0.5 mM. quantity of bisbenzonitrile palladium chloride and 0.5 mM. of tri-n-butylphosphine were dissolved in 40 ml. of acetone and one mM. of AgBF$_4$ in acetone was added dropwise to the solution. After filtering the precipitated AgCl, the filtrate containing the catalyst was fed into a 200 cc. autoclave made of titanium. A 0.50 mole amount (52 g.) of styrene was fed into the autoclave which was purged with nitrogen and ethylene was quickly added to give a pressure of 10 kg./cm.$^2$ at 30–33° C. After one hour, the pressure decreased to 3 kg./cm.$^2$. More ethylene was added to make the total pressure 10 kg./cm.$^2$ and the reaction was continued for four hours. After the reaction, the unreacted ethylene was removed and the reaction mixture was distilled to yield 51.5 g. of a styrene and butenylbenzene fraction (I) and 8.6 g. of a styrene dimer fraction (II). Gas chromatographic analysis of fraction (I) showed that 13 g. of styrene and 38.5 g. of butenylbenzene were produced. Conversion of styrene to products was 75%.

IR, NMR, and mass spectrum analysis showed that styrene was converted to a styrene dimer and two butenylbenzene isomers. Their structures and selectivities are shown as follows:

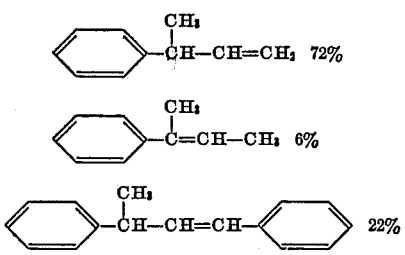

EXAMPLE 31

A catalyst solution prepared as described in Example 30, containing 0.5 mM. of

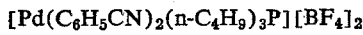

in 30 ml. of acetone was treated with 0.50 mole (52 g.) of styrene and 0.8 mole (34 g.) of propylene at 80° C. for 1.4 hours. IR, NMR and mass spectrum analyses of the reaction products showed a 55% conversion of styrene to product. The products and their selectivities are as follows:

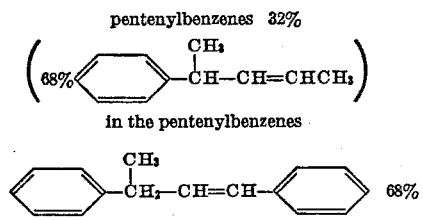

EXAMPLE 32

To 0.25 mM. of π-methallyl palladium chloride and 0.5 mM of tri-n-butylphosphine in 20 ml. of acetone, was added 0.5 mM of $AgBF_4$, and precipitated AgCl was filtered to yield the catalyst solution. A 0.50 mole (52 g.) quantity of styrene and 0.7 mole (61 g.) of methyl acrylate were added to the catalyst solution and were reacted at 100° C. for five hours. The conversion of styrene was 94%, and the selectivity of phenylpentenoic acid methyl ester based on styrene was 75% (85% selectivity based on methyl acrylate). The two phenylpentenoic acid methyl ester isomers formed were as follows:

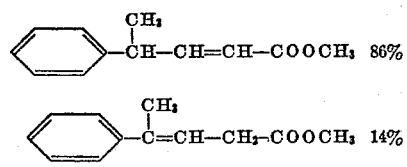

EXAMPLE 33

A catalyst solution prepared as in Example 32, except that triphenylphosphine was used instead of tri-n-butylphosphine was fed into a reactor together with 0.50 mole (52 g.) of styrene. Ethylene was added twice to the reactor at a pressure of 8 kg./cm.² during the reaction. Conversion of styrene was 82%, and the products formed and their selectivties were as follows:

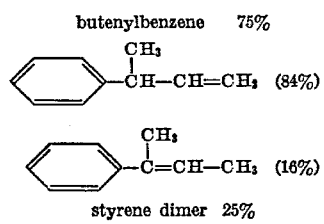

styrene dimer 25%

EXAMPLE 34

To 0.25 mM. of π-methallyl palladium chloride and 0.5 mM. of tri-n-octylphosphine in 20 ml. of acetone was added 0.5 mM. of $AgBF_4$, and the precipitated AgCl was filtered to yield the catalyst solution. The catalyst solution and 0.50 mole (59 g.) of vinyl toluene was fed into an autoclave. Ethylene was added to a pressure of 24 kg./cm.², and the mixture was reacted at 25–32° C. for two hours. Conversion of vinyltoluene was 90%, and the products and their selectivities were as follows:

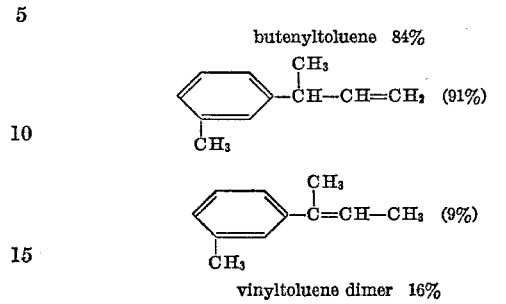

vinyltoluene dimer 16%

EXAMPLE 35

To 0.5 mM. of bisdimethylformamide palladium chloride [$Pd(DMF)_2Cl_2$] and 0.5 mM. of tri-n-butylphosphine in 20 ml. of methanol was added 0.5 mM. of $Ag_2SiF_6$ in 10 ml. of methanol, and the precipitated AgCl was filtered to yield the catalyst solution. The catalyst solution and 0.5 mole (52 g.) of styrene were fed into a reactor. Ethylene was added until a pressure of 17 kg./cm.² was reached and the mixture was reacted at 45° C. for 6 hours. After the reaction, the reaction mixture was treated and analyzed as in Example 30. Analysis revealed a yield of 4.4 g. of styrene dimer and 11.3 g. of

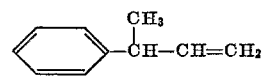

EXAMPLE 36

To 0.25 mM, of π-allyl palladium chloride and 0.5 mM. of tri-n-butylphosphine in 20 ml. of acetone was added 0.5 mM. of $AgPF_6$, and the precipitated AgCl was filtered to yield the catalyst solution. The catalyst solution and 0.5 mole (52 g.) of styrene were fed into a reactor. Ethylene was added until a pressure of 16 kg./cm.² was attained and the mixture was reacted at 25–30° C. for 6 hours. Conversion of styrene was 90%, and the selectivity was 60% to butenylbenzene and 40% to styrene dimer.

EXAMPLE 37

To 0.25 mM. of π-methallyl palladium chloride and 0.5 mM. of triethylphosphine in acetone was added 0.5 mM. of $AgClO_4$, and the precipitated AgCl was filtered to yield the catalyst solution. The catalyst solution and 0.5 mole (52 g.) of styrene were fed into a reactor. Ethylene was added until a pressure of 24 kg./cm.² was attained, and the mixture was reacted at 30–35° C. for 5.5 hours. Conversion of styrene was 80%, and the selectivity was 75% to butenylbenzene and 25% to styrene dimer.

EXAMPLE 38

To 0.25 mM. of π-methallyl palladium chloride and 0.5 mM. of tri-n-butylphosphine in 30 ml. of acetone, was added 0.5 mM. of $AgBF_4$, and the precipitated AgCl was filtered to yield the catalyst solution. The catalyst solution and 0.3 mole (33.6 g.) of α-methylstyrene were fed into a reactor. Ethylene was added until a pressure of 13 kg./cm.² was reached, and the mixture was reacted at 45–50° C. for five hours to yield 8.3 g. of pentenylbenzene.

Having now fully described the invention, it will be apparent to one of ordinary skill in the art that many changes and modifications can be made thereto without departing from the spirit or scope of the invention as set forth herein. Accordingly,

What is claimed and intended to be covered by Letters Patent is:

1. A process for producing a chain oligomer containing a vinyl aromatic component which comprises homo-oligomerizing a vinyl aromatic monomer having the formula:

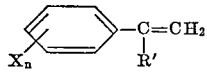

wherein R' represents hydrogen or a lower alkyl group; and X represents alkyl, aryl, alkenyl, alkoxy, alkoxycarbonyl, acyloxy, halogen or a group which forms a naphthalene ring by condensation with the phenyl ring of the formula and $n$ represents an integer of from 0 to 5, co-oligomerizing said vinyl aromatic monomer with an $\alpha$-mono-olefin having the formula:

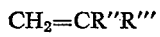

wherein R'' represents hydrogen and lower alkyl, and R''' represents hydrogen, lower alkyl, lower alkoxycarbonyl and aryl, in the presence of a cationic palladium complex prepared by treating a palladium compound, with a reagent containing a complex fluoro anion or a perchlorate anion and with a trivalent organophosphorous ligand.

2. The process of claim 1, wherein the catalyst system comprises a cationic palladium complex prepared by treating a palladium compound with a reagent containing a complex fluoro anion or the perchlorate anion, and with a trivalent organophosphorous ligand together with a Lewis acid.

3. The process of claim 1, wherein the trivalent organophosphorous ligand is a compound having the formula:

wherein $Z_1$, $Z_2$ and $Z_3$ represent alkyl, cycloalkyl, aryl, alkoxy or aryloxy groups.

4. The process of claim 1, wherein the palladium compound is an inorganic salt, an organic salt or a complex of palladium.

5. The process of claim 1, wherein the compound containing the complex fluoro anion is $AgBF_4$, $AgPF_6$, $AgSbF_6$, $Ag_2SiF_6$, $HBF_4$ or $HPF_6$, and wherein the compound containing the perchlorate anion is $AgClO_4$.

6. The process of claim 1, wherein the cationic palladium complex is prepared by reacting a quantity of a reagent containing a complex fluoro anion or the perchlorate anion with a palladium compound containing an equivalent amount of an anion component.

7. The process of claim 4, wherein said inorganic salt of palladium is palladium chloride, palladium bromide, palladium iodide or palladium nitrate.

8. The process of claim 4, wherein the organic salt of palladium is palladium acetate or palladium benzoate.

9. The process of claim 4, wherein the complex of palladium is selected from the group consisting of bisacetylacetonatopalladium, dihalobis($\pi$-allyl)dipalladium and dihalobis(1-methyl, $\pi$-allyl)dipalladium.

10. The process of claim 4, wherein the palladium complexes contain neutral ligands selected from the group consisting of benzonitrile, dimethylformamide, butadiene or cyclooctadiene.

11. The process of claim 3, wherein the trivalent organophosphorous ligand is trialkylphosphine, tricyclohexylphosphine or triphenylphosphine.

12. The process of claim 11, wherein the trialkylphosphine is triethylphosphine, tri-isopropylphosphine, tri-n-butylphosphine or tri-n-octylphosphine.

13. The process of claim 9, wherein the dihalobis($\pi$-allyl)dipalladium compound is dichlorobis($\pi$-allyl)dipalladium or dibromobis($\pi$-allyl)dipalladium.

14. The process of claim 2, wherein the Lewis acid is $BF_3$, $PF_5$, $SbF_5$, $AsF_5$ or $BH_3$.

15. The process of claim 2, wherein the cationic palladium complex the phosphorous ligand to palladium ion molar ratio is 2:1 and the Lewis acid to palladium ion molar ratio is 1:1.

16. The process of claim 1, wherein the vinyl aromatic monomer is styrene, $\alpha$-methylstyrene or vinyltoluene.

17. The process of claim 1, wherein the $\alpha$-monoolefin is ethylene, propylene or methylacrylate.

18. The process of claim 1, wherein the reaction temperature ranges from 0° to 150° C.

19. The process of claim 1, wherein a polar solvent is used in the reaction.

20. The process of claim 1, wherein homo-oligomers are produced by oligomerizing vinyl aromatic compounds.

21. The process of claim 1, wherein co-oligomers are produced by reacting a vinyl aromatic compound with an $\alpha$-mono-olefin.

22. A process for producing a chain styrene oligomer which comprises reacting styrene in the presence of a cationic palladium complex prepared by treating a palladium compound with a reagent containing a complex fluoro anion or a perchlorate anion and with a trivalent organophosphorous ligand.

References Cited
UNITED STATES PATENTS

| | | | |
|---|---|---|---|
| 3,328,699 | 2/1969 | Schleimer | 260—669 P |
| 3,567,762 | 3/1971 | Shier | 260—680 B |
| 3,669,949 | 6/1972 | Yoo | 260—680 B |

CURTIS R. DAVIS, Primary Examiner

U.S. Cl. X.R.

260—476 R, 668 R, 671 A, 680 B